United States Patent [19]

Leidner

[11] Patent Number: 5,232,606
[45] Date of Patent: Aug. 3, 1993

[54] PROCESS FOR RECYCLING OF SUPPORTED OR CONTAMINATED PVC

[75] Inventor: Jacob Leidner, North York, Canada

[73] Assignee: Ortech Corporation, Mississauga, Canada

[21] Appl. No.: 873,344

[22] Filed: Apr. 21, 1992

Related U.S. Application Data

[63] Continuation of Ser. No. 693,666, Apr. 30, 1991, abandoned.

[30] Foreign Application Priority Data

May 1, 1990 [GB] United Kingdom ............... 9009797

[51] Int. Cl.⁵ .............................................. B01P 11/02
[52] U.S. Cl. .................................... 210/773; 210/737; 210/738; 210/766; 210/774; 210/781; 209/3; 209/172; 521/46.5; 525/225; 526/209
[58] Field of Search ............... 210/781, 766, 737, 738, 210/780, 774, 773; 209/3, 172; 521/46.5; 525/225; 526/209

[56] References Cited

U.S. PATENT DOCUMENTS

| | | | |
|---|---|---|---|
| 3,335,966 | 8/1967 | Haveman | 209/3 |
| 3,736,271 | 12/1970 | Schutzeet | 521/46.5 |
| 3,836,486 | 9/1974 | Hafner | 521/46.5 |
| 4,038,219 | 7/1977 | Boehm et al. | 521/46.5 |
| 4,071,479 | 1/1978 | Broyde et al. | 521/46.5 |
| 4,578,184 | 3/1986 | Rasmussen | 209/3 |
| 4,746,422 | 5/1988 | Grimm | 209/172 |

FOREIGN PATENT DOCUMENTS

| | | | |
|---|---|---|---|
| 0496570 | 2/1978 | Australia | 521/46.5 |
| 2302181 | 9/1976 | France | 521/46.5 |
| 2390464 | 1/1979 | France | 521/46.5 |
| 41343/74 | 8/1974 | Japan . | |
| 0142476 | 12/1978 | Japan | 521/46.5 |
| 0015433 | 1/1985 | Japan | 521/46.5 |
| 1195164 | 6/1970 | United Kingdom . | |

*Primary Examiner*—Robert A. Dawson
*Assistant Examiner*—David Reifsnyder
*Attorney, Agent, or Firm*—Bell, Seltzer, Park & Gibson

[57] ABSTRACT

A method is provided for recovering PVC from a material including PVC and one or more non-PVC components, in which the material is mixed with a sufficient amount of a plasticizer at an effective temperature, preferably in the range of 100°-200° C., to give a PVC: plasticizer ratio such that the PVC and plasticizer form a mixture which is a liquid at that temperature so that the liquid PVC/plasticizer can be separated from the non-PVC component or components.

9 Claims, No Drawings

PROCESS FOR RECYCLING OF SUPPORTED OR CONTAMINATED PVC

This application is a continuation of application Ser. No. 07/693,666, filed Apr. 30, 1991, now abandoned.

FIELD OF THE INVENTION

This invention relates to recovery and recycling of polyvinylchloride (PVC) materials.

BACKGROUND OF INVENTION

As concerns mount with respect to environmental pollution, and waste disposal becomes more difficult and more expensive, there is increasing interest in recycling processes.

PVC itself can be recycled by melting and reprocessing. Flexible PVC products, however, frequently combine PVC with other materials, either other plastics or non-plastic materials, for example with polyester film in exterior automotive body mouldings, textiles in PVC tablecloths and aluminum in packaging film.

The presence of such additional non-PVC components makes recycling of the PVC product very difficult or even virtually impossible.

Methods have been suggested for separating the PVC from the contaminating material. Solvent extraction to dissolve out the PVC followed by filtration to remove the insoluble material is one proposed method.

Cryogenic grinding has also been suggested. The supported PVC material is cooled to a low temperature at which the PVC component becomes brittle. The material is then treated to pulverise the PVC, the non-pulverised contaminating material being separated by screening.

These methods are too expensive to be of general application.

For PVC-containing products in which PVC is not bonded to the other components, physical separation methods such as air separation or vibration separation may be able to remove the major part of these other components, but may leave the PVC insufficiently pure for certain further applications.

SUMMARY OF THE INVENTION

A method is provided for recovering polyvinylchloride (PVC) from a material comprising PVC and at least one non-PVC component. The method comprises the steps of mixing the material with an effective amount of a plasticiser at an effective temperature to give a PVC : plasticiser ratio such that the PVC and plasticiser form a mixture which is a single phase liquid at that temperature; and separating the single phase liquid PVC/plasticiser mixture from the non-PVC component.

DETAILED DESCRIPTION OF THE INVENTION

Flexible PVC is a combination of PVC resin and plasticisers. Plasticisers may comprise up to 50% by weight of the combination in flexible PVC products.

The present invention provides a novel and economic method for recovering PVC from materials in which it is supported by or contaminated with non-PVC materials, either non-PVC plastics such as polyester, as in automotive mouldings containing polyester film, or non-plastic materials such as fabric, paper, copper or aluminum.

The material from which PVC is to be recovered may, if necessary, be shredded. The word "shredded" is used herein to mean any method of reducing the material to small pieces suitable for mixing with plasticiser and includes shredding, cutting or chopping.

The melt viscosity of a mixture of PVC and plasticiser is a function of the plasticiser content. The greater the plasticiser content, the lower the melt viscosity at a given temperature.

In accordance with the method of the invention, the PVC-containing material to be recycled is mixed with sufficient plasticiser at a suitable temperature, to give a resulting PVC:plasticiser component of the mixture having a PVC:plasticiser ratio such that it is a liquid at that temperature and may be conveniently separated from the remaining solid non-PVC component.

The present invention also provides a novel method for purifying PVC recovered from materials in which the PVC is not bonded to other components and can be initially recovered by physical separation methods, such as air separation or vibration separation, leaving the PVC contaminated with a small proportion of the other components.

This partially purified PVC-containing material is mixed with plasticiser and treated by the method of the invention as described above.

It is preferred to maintain as low a temperature as possible, consistent with having a liquid PVC/plasticiser mixture, in order to minimize degradation of PVC.

The plasticiser may be pre-heated to the desired temperature before mixing with the PVC-containing material or the PVC-containing material may be mixed with cold plasticiser and the resulting mixture heated to the desired temperature.

The mixture must remain at a temperature such that the PVC/plasticiser component remains liquid until it has been separated from the non-PVC component. Depending on the bulk of the material being processed, the mixture may require additional heating during processing to maintain the desired temperature.

In a preferred embodiment of the invention, the material being processed is mixed with plasticiser at a temperature in the range from about 100° C. to about 200° C.

Examples of suitable plasticisers are dioctyl phthalate and epoxidised soy bean oil. Other examples will be known to those skilled in the art.

In a further preferred embodiment, plasticiser is added to give a PVC : total plasticiser ratio in the range from about 40 : 60 to about 1 : 99 by weight. Total plasticiser means the sum of the added plasticiser and the plasticiser present in the PVC-containing material being processed.

In an especially preferred embodiment, plasticiser is added to give a PVC : total plasticiser ratio in the range from about 40 : 60 to about 20 : 80 by weight.

The liquid PVC/plasticiser mixture may be separated by any suitable method from the solid non-PVC material, for example, by centrifugation or filtration although other methods will be known to those skilled in the art.

The liquid PVC/plasticiser mixture, once separated from the non-PVC material, is ready for re-use by adjustment of the PVC : plasticiser ratio to a desired value by addition of PVC resin.

Although preferred embodiments of the present invention have been described, the present invention is not limited to the features of these embodiments but includes all variations and modifications within the scope of the claims.

I claim:

1. A method for recovering polyvinylchloride (PVC) from a material comprising PVC and at least one non-PVC component, said method of comprising the steps of
   (a) mixing said material with an effective amount of a plasticizer at an effective temperature to give a PVC:plasticizer ratio such that said PVC and plasticizer form a mixture which is a single phase liquid at that temperature;
   (b) separating said single phase liquid PVC/plasticizer mixture from said non-PVC resin to said single phase liquid
   (c) adding PVC resin to said single phase liquid PVC/plasticizer mixture from step (b) to give a desired PVC:plasticizer ratio and provide a recovered PVC ready for re-use.

2. A method in accordance with claim 1 wherein said material is shredded before mixing with plasticiser as in step (a).

3. A method in accordance with claim 1 wherein said plasticiser is heated to said effective temperature prior to mixing with said material.

4. A method in accordance with claim 1 wherein said liquid PVC/plasticiser mixture is separated by centrifugation from said non-PVC component.

5. A method in accordance with claim 1 wherein said liquid PVC/plasticiser mixture is separated by filtration from said non-PVC component.

6. A method in accordance with claim 1 wherein said effective temperature is in the range from about 100° C. to about 200° C.

7. A method in accordance with claim 1 wherein said material is mixed with plasticiser to give a PVC : plasticiser ratio in the range from about 40 : 60 to about 1 : 99 by weight.

8. A method in accordance with claim 7 wherein said PVC : plasticiser ratio is in the range from about 40 : 60 to about 20 : 80 by weight.

9. A method for recovering polyvinylchloride (PVC) from a material comprising PVC and at least one non-PVC component, said method comprising the steps of
   (a) mixing said material with an effective amount of a plasticizer at an effective temperature to give a PVC:plasticizer ratio from about 40:60 to 1:99 by weight such that said PVC and plasticizer form a mixture which is a single phase liquid at that temperature;
   (b) separating said single phase liquid PVC/plasticizer mixture from said non-PVC component; and
   (c) adding PVC resin to said single phase liquid PVC/plasticizer mixture from step (b) to give a desired PVC: plasticizer ratio and provide a recovered PVC ready for re-use.

* * * * *

UNITED STATES PATENT AND TRADEMARK OFFICE
CERTIFICATE OF CORRECTION

PATENT NO. : 5,232,606

DATED : August 3, 1993

INVENTOR(S) : Jacob Leidner

It is certified that error appears in the above-identified patent and that said Letters Patent is hereby corrected as shown below:

On title page, item [56]
UNDER REFERENCES CITED:

"3,736,271  12/1970 Schutzeet" should be -- 3,736,271 12/1970 Schutze et al--

IN THE CLAIMS:

Column 3, lines 14-15, after "non-PVC" delete "resin to said single phase liquid" and insert -- component; and --.

Signed and Sealed this

Third Day of May, 1994

Attest:

BRUCE LEHMAN

Attesting Officer

Commissioner of Patents and Trademarks